G. A. SCHERPF.
Preserving Meat.
No. 4,035.
Patented May 7, 1845.
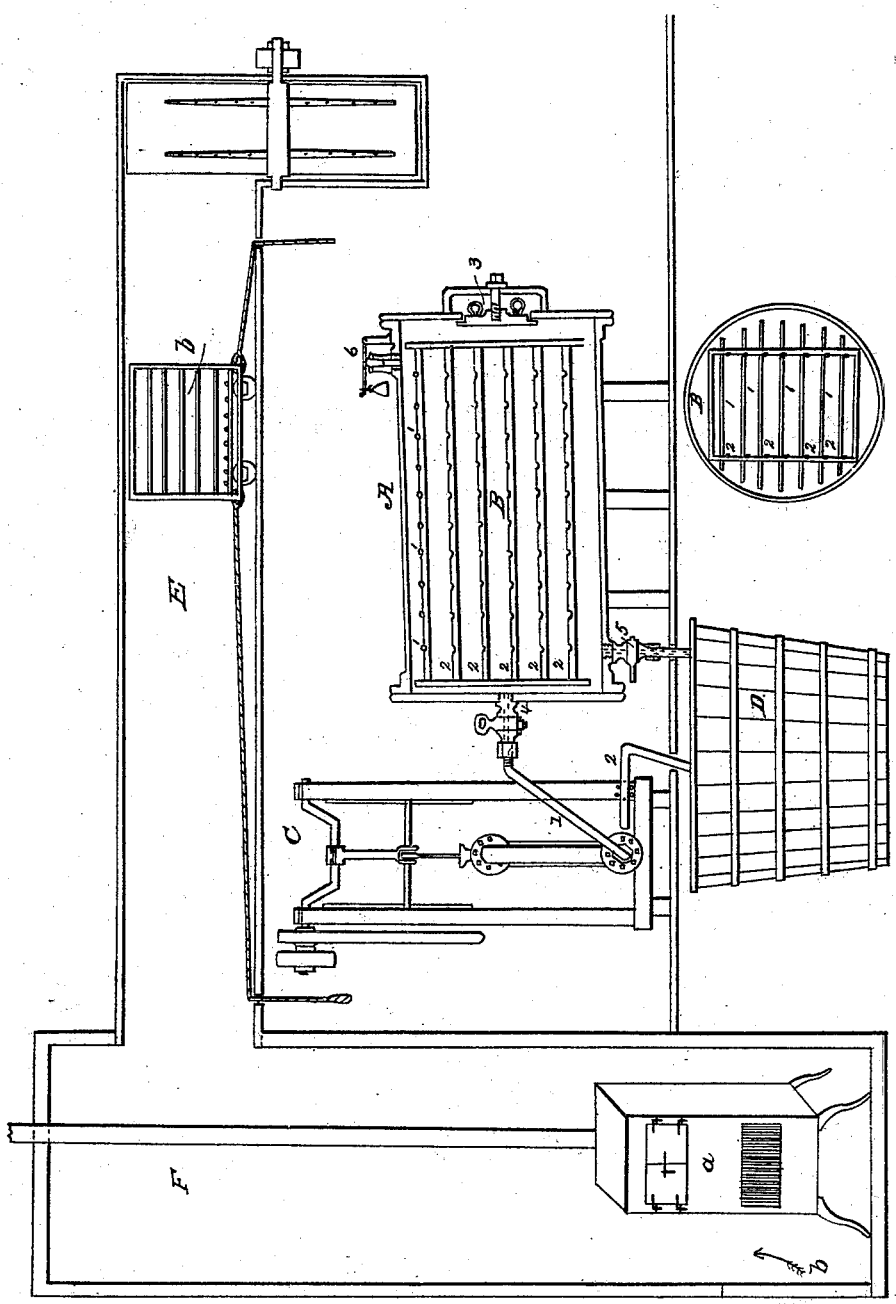

UNITED STATES PATENT OFFICE.

GEORGE A. SCHERPF, OF NEW YORK, N. Y.

CURING MEAT.

Specification of Letters Patent No. 4,035, dated May 7, 1845.

*To all whom it may concern:*

Be it known that I, GEORGE A. SCHERPF, of New York, county and State of New York, have invented a new and Improved Mode for Curing or Preparing for Preservation Meat, and Particularly Ham, Bacon, and Smoked Beef; and I do herewith declare that the following is a full and exact description thereof.

In order to show, wherein consist the peculiar character and efficacy of my new method, I cannot abstain from first determining the principles on which the curing of meat depends. The traditional popular mode of curing meat, where it is correctly done, rests, in the means usually applied, not upon the salt or upon certain agencies contained in smoke, but on the most natural, powerful and simple means of preserving animal or vegetable matter, desiccation to a certain degree. It is a great error to suppose that salt and smoke are the best or only means of preservation, because in curing meat, it is never to be forgotten, that it is intended for an aliment, and has to undergo digestion which is a species of decomposition, and as an unvitiated taste and sound common sense, constantly will prefer fresh aliments to preserved ones, the quality of any preserved meat must be considered so much the better, as it approaches more to the same meat when fresh, in taste and digestibility. To obtain this result, nature has no better means, whose effect is the least detrimental to the quality of the product, than desiccation. In certain latitudes, climatical conditions are so favorable as to effect rapidly a sufficient desiccation by simple exposure to the air. In other climates where the air is not of sufficient dryness, the popular habit, followed since many centuries, applies: 1st, impregnation with salt, on account of its quality to accelerate desiccation, for which purpose a limited quantity is sufficient, and 2d, the chimneys of houses, as a locality at everybody's disposition, where a current of air is obtained, but not for the purpose of exposing the meat to smoke alone, which, although coöperating is yet entirely superfluous, if a rapid desiccation is obtained by other more innocent means. Considering the effect of salt upon animal aliments, for itself alone, it is by no means a powerful antiseptic, even if applied in large proportion. This is fully proved by great numbers of barrels of salt meat, which so frequently spoil, by the poor quality of common salted meat as an aliment and by different diseases originating from its too copious use. So do dry salted fish and skins easily spoil, whenever they get wet and remain so in contact with air. Yet hams and bacon are now prepared, by keeping the meat for weeks and months immersed in the strongest pickle, to give sufficient time to the salt to spoil the meat by greatly reducing its alimentary qualties, as it is an undeniable fact, that little salt promotes and much of it prevents digestion. As for the effect of the active principles of smoke upon animal aliments, it can only be considered detrimental. Their effect is greatly akin to that of some of the most violent poisons, as arsenic, sublimate, tannin, whose effect upon the digestive organs of a living organism as well as upon dead animal matter, is perfectly similar to that of creosote or pyroligneous acid, viz: antiseptic, desiccating, with the only difference, that the first named poisons are more powerful. Hence it comes, that smoked meat so frequently causes, to persons whose digestive organs are not very healthy and powerful, indigestion, nausea, and other disagreeable symptoms, which equally appear, when both these products of smoke are taken into the stomach alone or in any mixture, however small the dose. Their application ought therefore be carefully regulated and great moderation observed therein. Yet meat is hung in low closed smoke houses, exposed to thick hot smoke, without any or sufficient change of air where, if the smoking is protracted long enough to obtain a sufficient desiccation, it is, no doubt often, penetrated by smoke to such a degree as to render it unwholesome for consumption. The accessory and detrimental means of preservation, salt and smoke, are in this way taken for the principal and innocent, desiccation, which is left to be performed by the way, little or much, as it happens, or not at all.

My new method, consists in the following operation, the apparatus for it, being represented by the annexed drawing.

A represents a cylinder of suitable material, shape, and construction, which contains a square crate B, into which the meat is stowed so disposed upon bars, as to offer sufficient contact to the fluid to its entire surface, with movable slats 1, laid across the fixed bars (2). The manhole (3) being hermetically closed, the force-pump (C) is set in motion, to withdraw the air from the cylinder. This object being obtained, the stopcock (4) is closed, and the other (5) opened, which is connected by means of a pipe, with a vessel D, containing the antiseptic substances, with which the meat is to be impregnated, in solution, which liquid immediately rises and fills the cylinder. The stopcock (5) being now closed the pipe (1) is transferred to the other mouth of the pump, and the pipe (2) is applied to the suction mouth, which pipe equally dips into the vessel D. The pump is again set to work, (see model), to force a further supply of liquid into the cylinder, till such a degree of pressure is obtained, as has by experience been found necessary for a perfect and rapid penetration of the meat, 60 to 80 pounds per inch, being commonly sufficient. To indicate the moment when this pressure is obtained, a safety valve (6) is applied to the highest point of the cylinder, where it equally serves for the purpose of allowing the escaping of the small quantity of air which might have yet remained, so that the uppermost layer of meat may not be surrounded partially by compressed air. The meat having been subjected to this pressure for a short period, the stop cock (4) is again closed, and (5) is opened, through which the remaining liquid escapes into D, as far as the compression goes, and the remainder will sink into D as soon as the safety valve is opened and air admitted, for which purpose, the cylinder is laid slanting and the vessel D placed beneath it. The cylinder can now be opened and the meat withdrawn to undergo the operation of desiccation in the following apparatus: E is a horizontal conduit, square, of any suitable material, in connection with F, a chamber, containing a stove (a).

b is a crate, similar to the one inside the cylinder, set upon rollers. The conduit E is of a length and size, proportioned to the quantity of meat constantly operated upon, either in one horizontal length, or divided in stories, and contains if necessary a train of several such crates in connection. The stove a being heated the air entering the chamber F at b, receives a certain degree of warmth, and passes through E with as much velocity as can by any means be obtained, either by conducting the end of the conduit, vertically upward into the higher stratas of air, or by applying to the end of the horizontal conduit a ventilating wheel, put in motion by any mechanical force, or by a vertical elevation and ventilating wheel united or by any means creating a rapid current of air. The meat being disposed upon the crates b, with sufficient liberality of space to allow free access to the air, is first exposed to the current at the farthest point from the heating chamber, and gradually approached to it, in order to receive the air first less and gradually more warm.

Doors are inserted into the conduit by which the crates can be withdrawn, discharged, and upon a platform running outside, returned to the other end of the conduit, there to be again filled with fresh meat.

It is too obvious, that this method unites great rapidity and saving of labor in the process of impregnating the meat with antiseptic substances, with the means of having at command the nicest regulation of the quantity of those substances, saline or others, and of employing other volatile substances, less objectionable than the volatile and pyroligneous principles of smoke or even dispensing with such entirely.—If it reinstates the most effective and natural means of preservation, desiccation, into its importance, performing it in an improved way, with rapidity, economy, and cleanliness.

I do not claim as my invention the impregnation of meat by hydraulic or other pressure, nor do I claim the modes of producing desiccation, but What I do claim, is—

The process substantially as herein described, of curing meat by combining the operations of impregnation and desiccation in the manner set forth.

GEO. A. SCHERPF.

Witnesses:
 H. AUSTIN,
 F. W. BODSTEIN.